United States Patent
Burckard

(10) Patent No.: US 9,356,714 B2
(45) Date of Patent: May 31, 2016

(54) METHOD FOR TRANSMITTING SERVICES INFORMATION IN DIFFERENT TYPES OF BROADCASTING NETWORKS AND UNIT FOR PROCESSING SAID INFORMATION

(75) Inventor: Antoine Burckard, Montigny le Bretonneux (FR)

(73) Assignee: NAGRAVISION S.A., Cheseaux-sur-Lausanne (CH)

(*) Notice: Subject to any disclaimer, the term of this patent is extended or adjusted under 35 U.S.C. 154(b) by 1734 days.

(21) Appl. No.: 11/896,212

(22) Filed: Aug. 30, 2007

(65) Prior Publication Data
US 2008/0066115 A1  Mar. 13, 2008

(30) Foreign Application Priority Data
Sep. 13, 2006  (EP) .................................. 06291450

(51) Int. Cl.
*H04N 7/173*  (2011.01)
*H04H 20/24*  (2008.01)
(Continued)

(52) U.S. Cl.
CPC ............. *H04H 20/24* (2013.01); *H04H 20/26* (2013.01); *H04H 20/93* (2013.01); *H04H 60/07* (2013.01); *H04N 21/2362* (2013.01)

(58) Field of Classification Search
USPC ........... 725/68, 100, 105, 109–113, 118, 131, 725/139, 151
See application file for complete search history.

(56) References Cited

U.S. PATENT DOCUMENTS 6,920,327 B1 * 7/2005 Brandes et al. ............. 455/452.1
2003/0078687 A1 * 4/2003 du Breuil ....................... 700/94

(Continued)

FOREIGN PATENT DOCUMENTS

EP   1 207 698   5/2002
EP   1 411 723   4/2004
(Continued)

OTHER PUBLICATIONS

Digital Video Broadcasting (DVB); Specification for Service Information (SI) in DBV systems [ETS 300 468] Second Edition Jan. 1997, p. 13.*
(Continued)

*Primary Examiner* — Yassin Alata
(74) *Attorney, Agent, or Firm* — Harness, Dickey & Pierce, P.L.C.

(57) ABSTRACT

A method for transmitting services information in a broadcasting network by at least one managing center towards a plurality of receivers connected on one hand to a digital data streams broadcasting network of DVB type and on the other hand to a digital data streams broadcasting network of IP type, said streams comprising content data of the services and additional information data on said services structured in tables adapted to the transmission protocol specific to each type of network. The method comprises the steps of exploring the streams broadcasted by the network of type DVB and the streams broadcasted by the network of type IP and extracting services information from these streams, completing an information table, situated at the highest level in the hierarchy of the services information tables, included in the service information DVB-SI transmitted by the DVB network by services information related to the IP network, and transmitting the completed information table in the streams broadcasted by the DVB network towards the receivers having two switchable receiving modules, connected respectively to a DVB and an IP services broadcasting network. The receivers are able to activate the reception of digital data of a service, equivalent to the service currently received, with a second receiving module when the receiving conditions by the first receiving module are degraded.

12 Claims, 1 Drawing Sheet

(51) Int. Cl.
*H04H 20/26* (2008.01)
*H04H 20/93* (2008.01)
*H04H 60/07* (2008.01)
*H04N 21/2362* (2011.01)

(56) References Cited

U.S. PATENT DOCUMENTS

| | | | |
|---|---|---|---|
| 2003/0172385 A1* | 9/2003 | Takatori | 725/113 |
| 2004/0205218 A1* | 10/2004 | Nakaoka et al. | 709/231 |
| 2007/0110105 A1* | 5/2007 | Usuki et al. | 370/487 |
| 2009/0222871 A1* | 9/2009 | Schaefer et al. | 725/114 |

FOREIGN PATENT DOCUMENTS

| | | |
|---|---|---|
| EP | 1 464 176 | 4/2004 |
| FR | 2 864 869 | 7/2005 |
| WO | WO 2005043784 A1 * | 5/2005 |
| WO | WO 2006/061760 | 6/2006 |
| WO | WO 2006061760 A2 * | 6/2006 |

OTHER PUBLICATIONS

Digital Video Broadcasting (DVB); Trnsport of MPEG-2 Based DVB Services over IP Based Networks [ETSI TS 102034] V.1.1.1 (Mar. 2005), p. 22-23.*

* cited by examiner

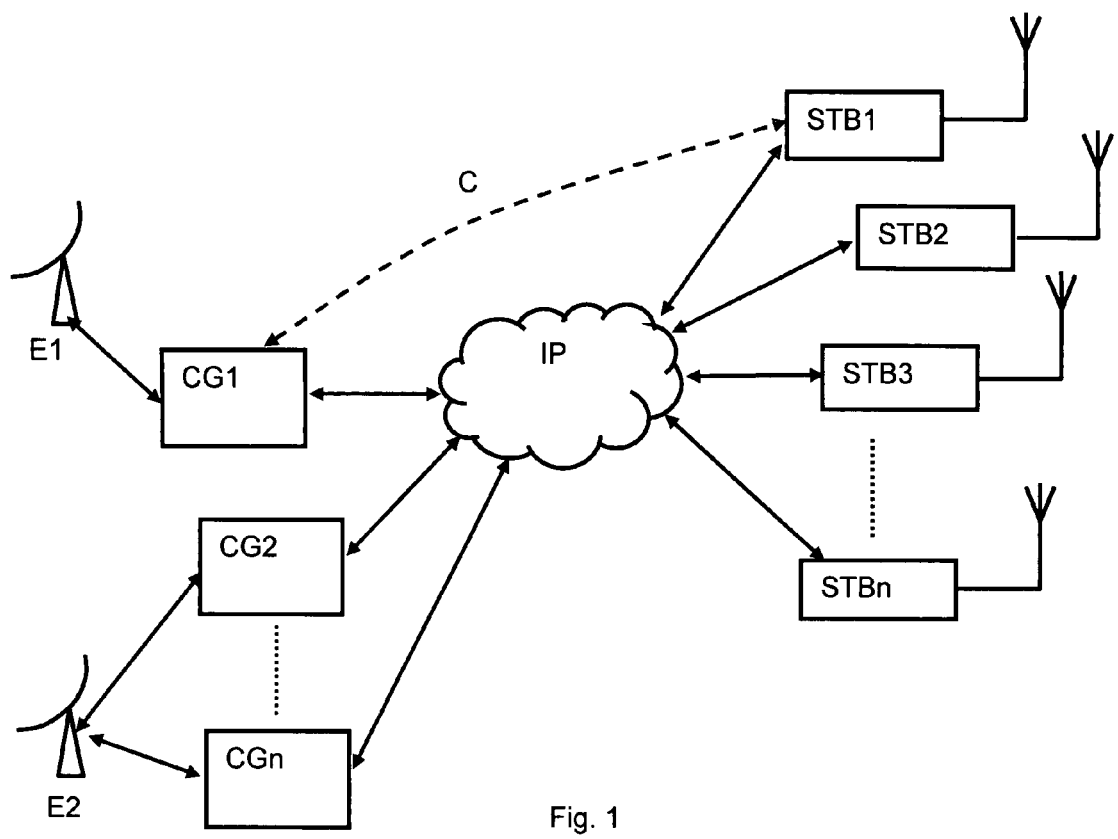
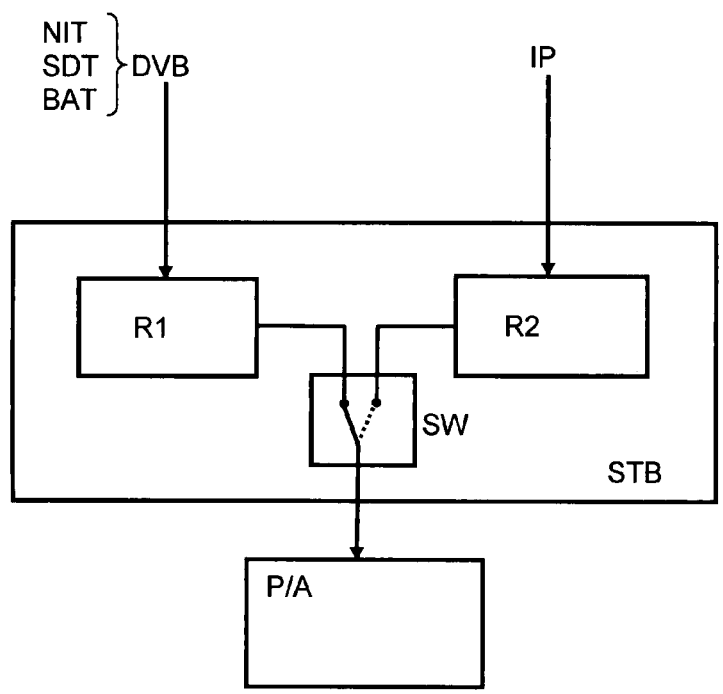
Fig. 1
Fig. 2

METHOD FOR TRANSMITTING SERVICES INFORMATION IN DIFFERENT TYPES OF BROADCASTING NETWORKS AND UNIT FOR PROCESSING SAID INFORMATION

FIELD OF THE INVENTION

The present invention concerns the field of broadcasting, in a network, digital data streams comprising services and information data towards a plurality of receivers. More particularly, the invention relates to the transmission and the reception of information data relative to services provided by different types of broadcasting networks. This information tells a user about access and the characteristics of the services available from receivers equipped with appropriate interfaces.

BACKGROUND OF THE INVENTION

The DVB (Digital Video Broadcasting) standard defines a service as a set of digital data managed by an operator and broadcasted in a transport stream through terrestrial broadcast or via satellite or via a cable towards a plurality of receivers/decoders. These data correspond generally to television or radio programs, specific information (commercial promotions, stock exchange, weather, events, etc.) or to any other multimedia application usable one line or after downloading on an appropriate medium.

The transport stream contains data of a service consisting of for example an audio/video content accompanied by additional data such as sub-titles, teletext, or interactive applications and information on the service such as the content description, the broadcasting time schedule, access conditions etc.

The document EP1464176 describes a method allowing using data provided by the Digital Video Broadcasting-Services Information Event Information Table (DVB-SI EIT) for accessing to a stream broadcasted in IP (Internet Protocol) mode. A proposed event is associated to at least two sources and the system allows a transparent access to this event whatever the source is. An adequate receiver comprises means of information on the services allowing using event information data for accessing to the content broadcasted according to the Internet Protocol. These means of information use announcement and services description protocols for linking the services channels made available by the digital content provider and by the IP stream broadcasting services.

The document FR2864869 discloses a system for broadcasting DVB services via an IP network wherein signalization information describing the network and the offered services are separated from the services themselves. A receiver connected to a bidirectional network detects services by starting connection to a first stream for extracting localization information on the network. This information comprise on one hand data on the streams transporting the content of these services and on the other hand data on the separated streams transporting information on these services. During a final step, the receiver uses this information for establishing a list of services available on the network.

The document US2003/0078687 describes a method and a system of automatic configuration of a listening environment for an optimal sound reproduction based on the characteristics of the transmitted audio signal and of the service currently received. These characteristics as for example the broadcasting of the signal in mono or stereo mode are transmitted via standardized Event Information Table (EIT) used for building the Electronic Program Guide EPG. At reception of this information, the receiver configures itself, if allowed by the hardware and the system, according to the best mode, i.e. in stereo mode and this without any intervention of the user. According to an embodiment, the database of the program guide and the one of the channel list are combined and stored in a memory outside of the receiver as for example in a local server of the system (head end). A partial program guide accompanying the audio signal can thus be transmitted to the receiver which will extract the information necessary for a configuration leading to an optimal functioning.

The document EP1207698, describes a receiver for digital audio video programs comprising a first and a second reception unit receiving each programs respectively from a first and a second broadcasting network. These two networks are distinct, as for example a satellite or a terrestrial broadcasting network and an Internet broadcasting network. A program received by at least one of the two reception units is accompanied, at predetermined periods, by switching instructions for determining the reception of a program by one or the other of two units of the receiver. The user stores into the receiver information such as for example a list of favorite programs. At reception of a switching instruction the receiver connected to the satellite broadcasting network switches to Internet when it detects for example the URL (Uniform Resource Locator) address of one of the favorite programs of the list. This detection is carried out thanks to Internet selection data (URL for example) extracted from the Program Map Table (PMT) which Packet Identifier (PID) is located in the Network Information Table (NIT) transmitted with the audio video content of the program.

The document EP1411723 describes a method for obtaining information on the programs broadcasted in a transport stream. This information is obtained from Internet links or complete or partial URL contained in the Services Information (SI) or in Program Specific Information (PSI) comprising Program Map Tables (PMT) or Event Information Tables (EIT). The receiver rebuilds, if necessary, the complete path or URL from the receiver attribution identification data stored therein in order to download, from the content server thus defined, the information relative to one or several programs broadcasted in the stream.

In the systems of these documents, the receiver is in charge to exploit the services available on the network and to extract from the different tables the information necessary for building a program list. This list is stored in the receiver and made available to an Electronic Program Guide EPG displayed on a screen and working as an interface between the user and the receiver.

In certain configurations, the receiver or decoder also called set-top-box is connected on one hand to a cable or an antenna and one the other hand to a bidirectional IP network for receiving DVB services streams. These two broadcasting networks comprising each their own parameters, lead to a specific processing of the services information by the receiver. This local processing can occur an overloading of the receiver particularly when the number, the diversity of the proposed services and the complexity of their parameters become important.

SUMMARY OF THE INVENTION

The aim of the present invention is on one hand simplifying the service information data processing by the receiver and on the other hand guaranteeing a transparent retransmission of this information on a DVB network without prior exploration of the services available on the IP network by the receiver.

This aim is reached by a method for transmitting services information in a broadcasting network by at least one managing center towards a plurality of processing units connected on one hand to a digital data streams broadcasting network of DVB type and on the other hand to a digital data streams broadcasting network of IP type, said streams comprising content data of the services and additional information data on said services structured in tables adapted to the transmission protocol specific to each type of network, the method comprises the steps of:

- exploring the streams broadcasted by the network of type DVB and the streams broadcasted by the network of type IP and extracting services information from these streams,
- completing an information table, situated at the highest level in the hierarchy of the services information tables, included in the service information DVB-SI transmitted by the DVB network by services information related to the IP network,
- transmitting the completed information table in the streams broadcasted by the DVB network towards the processing units.

A processing unit corresponds here to any receiver configured for receiving and processing of broadcasted digital data such as a decoder or set top box, or a personal computer.

The method of the invention allows grouping in a table transmitted by the DVB network all the information on the available services whatever their source is. The receiver can thus display this information by only processing the stream broadcasted by the DVB network without processing the services information broadcasted on the IP network. The analysis of the different IP streams and the processing of the services information data by the managing center unburden thus the receiver from tasks which are often considerable.

In fact, the introduction of the IP services information extracted from the IP network into tables of a lower level such as the PMT tables (Program Map Table) or the EIT tables (Event Information Table) implies an analysis of all services and programs broadcasted in the DVB stream in order to insert this information into the correct tables. At reception, a similar analysis becomes necessary for retrieving the IP services information.

Among all tables included in the services information data, the NIT table (Network Information Table) is preferably used. It is situated at the highest level in the hierarchy of the services information tables with the SDT table (Service Description Table) and the BAT table (Bouquet Association Table). The using of these high level tables reduces in an important way the tasks of analysis and of processing executed on one hand on server side during insertion of IP services information and on the other hand on receiver side during determination of the IP service corresponding to the DVB service currently received.

In case of reception problems on the DVB network, the displayed information tell the user on the availability of equivalent services on the IP network. If necessary, the receiver can be switched on the IP network automatically according to a programming of the user interface or manually.

The services information data are generally extracted from a structure called SD&S (Service Discovery & Selection) transmitted by the IP network. They contain essentially the IP addresses and the descriptors of the services. According a configuration, they may also include the references of the IP broadcasters.

The NIT table groups the set of services data made accessible to a user by an operator. In an example of terrestrial transmission, this table contains information necessary for setting up the receiver for getting a DVB stream such as the frequency, the polarization, error correction parameters, the throughputs of the data streams etc. According to an embodiment the NIT table can be completed with the IP network information received from other ways as the SD&S structure, notably from files, from databases or from a manual capture.

A further object of the present invention is a processing unit of digital data services streams comprising a first receiver module receiving digital data streams of the type DVB and a second receiver module receiving digital data streams of the type IP linked to means for processing and displaying of broadcasted services information data, the processing unit further comprises switching means able to activate the reception of digital data of a service equivalent to the service currently received with the second receiver module when the receiving conditions by the first receiver module are degraded, the equivalent service being determined by an information table, situated at the highest level in the hierarchy of the services information tables, comprising the IP addresses and the descriptors of the services of the type DVB.

BRIEF DESCRIPTION OF THE DRAWINGS

The invention will be better understood thanks to the following detailed description referring to the enclosed figures given as non limitative examples:

FIG. 1 shows a plurality of receivers connected to a IP network and to a broadcasting network wherein the distribution of the digital streams is organized by managing centers.

FIG. 2 represents a block schematic of a processing unit comprising two switchable receiver modules, connected respectively to a DVB and an IP services broadcasting network.

DETAILED DESCRIPTION OF THE INVENTION

The block diagram of FIG. 1 shows a plurality of receivers or set top boxes (STB1 . . . STBn) receiving digital data from a DVB broadcasting network and connected to a IP network. The managing centers (CG1, . . . , CGn) depending on operators are in charge of the organization of the streams and of their broadcasting on the networks. In the example, the streams are transmitted to the receivers via terrestrial channels by emitters (E1, E2) or via cable (C) under the control of the managing centers (CG1 . . . CGn). The method of the invention is therefore carried out by the managing centers (CG1 . . . CGn) providing the services and the related information which complies with standards defined by the ETSI (European Telecommunication Standard Institute).

The document EN 300 468 entitled Digital Video Broadcasting (DVB); Specification for Service Information (SI) in DVB Systems published by ETSI describes the structure of the Services Information (SI) and the standard ISO/IEC 13818-1 MPEG-2 "Information technology—Generic coding of moving pictures and associated audio information: Systems" defines the Program Specific Information (PSI).

The PSI data allow configuring the receiver in an automatic way for de-multiplexing and decoding the different program streams it receives.

These PSI data are structured in four types of tables transmitted in sections, namely:

1) The Program Association Table (PAT)

It indicates for each service of the multiplex, the localization i.e. the values of the Packets Identifiers (PID) of the packets of the transport stream of the corresponding Program Map table (PMT). It provides also the localization of the Network Information Table (NIT).

2) The Conditional Access Table (CAT)

It provides information specific to the conditional access systems used in the multiplex comprising the localization of the Entitlement Management Messages (EMM) stream.

3) The Program Map Table (PMT)

It identifies and indicates the localizations of the streams of each service and the localization of the program clock reference fields for a service.

4) The Network Information Table (NIT)

Its localization is defined according to the standard ISO/IEC 13818-1 MPEG-2, the format of the data being not included in this standard. It provides information on the physical network such as the designation of the emitters (terrestrial or satellites) allowing retrieving other transport streams on the network. The NIT table, of higher hierarchical level relative to the other services information tables such as the EIT or PMT tables, describes the organization of the streams, it allows notably the receiver to configure itself.

The specific program information PSI is completed by data allowing the user to identify the services and the events transported in a multiplex or in a network. These data are distributed in tables such as:

The Bouquet Association Table (BAT) providing besides the name of the bouquet (set of programs or services made available to users by an operator), the list of services available in each bouquet. This table is facultative.

The Service Description Table (SDT) containing data describing services such as the names and the providers of the services.

The two mandatory high levels NIT (Network Information Table) and SDT (Service Description Table) are necessary for adjusting a receiver on a selected program.

The information on the content of the programs appears in the Event Information Table (EIT) which refers to each service from its identification according to the DVB standard. This information describes the different programs by proposing information similar to the one printed in a traditional TV programs magazine. It indicates notably the title, the starting time, the duration and the type of the program. For each program or service, other written information may complete the content data. For example, the information on all programs of the day and the 7 following days will be transmitted for displaying in the electronic program guide acting as user interface for an easy program selection. The main information contained in the EIT table is the name of the event, the starting time, the program duration, the program progress status, the program title, a summarized textual description of the content, the definition of the format of the picture and the sound (16:9, 4:3, mono, stereo, etc.), the exact starting time of a program allowing beginning a recording at the effective start even in case of delayed broadcasting of the program in question as done with the VPS (Video Programming System) system.

According to an embodiment, the BAT or SDT tables may be completed by supplementary services information related to the broadcasting on the IP networks in a same way than in the NIT table. This operation is carried out when the NIT table can not be modified because of restrictions imposed by services providers.

The document ETSI TS 102 034 entitled Digital Video Broadcasting (DVB); Transport of MPEG-2 Based DVB Services over IP Based Networks specifies the deployment of MPEG-2 DVB multimedia services on bidirectional IP networks. These IP networks allow broadcasting of important data streams thanks to the advent of the DSL (Digital Subscriber Line) technology which provides them a large bandwidth and a high data throughput.

The Network Information Tables NIT are not used in IP networks, the necessary information is transmitted in a SD&S (Service Discovery & Selection) structure. This structure provides information on offered services and on the way to access these services by means of IP addresses. It is similar to the one of Services Information (SI) of the traditional DVB networks which information can be transferred towards the appropriate SD&S structure.

The SD&S information can be delivered according to a "push multipoint mode" supporting live broadcasting of content or according to a "pull point to point" mode for broadcasting content on demand (VOD). Two types of structures are defined for live broadcasting, namely:

1) "TS Full SI" (Transport Stream full Service Information). This mode allows the transparent retransmission of the transport stream coming from other distribution networks (satellite, cable . . . ) comprising all SI tables without modifications. As the NIT table is replaced by the SD&S structures in the DVB-IP networks, it is ignored by the receiver and the DVB-IP service provider must generate additional services discover information.

2) "TS Optional SI" (Transport Stream Optional Service Information). In this mode, the retransmission of SI tables is optional and it is assumed that the DVB-IP services provider has other mechanisms for transmitting the appropriate services information. When the SI tables are present, the SD&S information has priority.

To summarize, the most SI information of the DVB networks are retransmitted either in a transparent way or transferred into SD&S structures before transmission in IP networks.

For broadcasting via the DVB networks, the NIT table or other tables grouping SI data can be modified by adding of IP networks information taken from other sources such as files or databases without having to extract them from the SD&S structures.

A NIT table contains information on the physical organization of the multiplexed streams transported by a given network and on the network itself. The combination of a network identifier with the transport stream identifier allows identifying in a unique way each transmitted stream. The networks are designated by identifiers or codes defining them in a unique way according to the document ETSI ETR 162 "Allocation of Service Information (SI) codes for Digital Video Broadcasting (DVB) systems". The receiver stores the information of the NIT table in a non-volatile memory in order to decrease the access time during the switching from one channel to another (zapping). A NIT table may be transmitted to other networks than the current one and it is differentiated by a table identifier.

The ETSI standards define the organization of the data streams transmitted with the necessary information for the reception of the services transported by these streams in function of the receivers' configuration. They let however some freedoms concerning the content of the tables, notably the services descriptors which may be adapted to the characteristics of the networks whereto the receivers are connected. Thus, the completion, according to the method of the invention, of a NIT table or other tables belonging to the services Information (SI) is not contraindicated by the standards as long as the introduced information respects the prescribed format and syntax.

Because the DVB-SI services information is transmitted by sections identified by packet identifiers PID, The NIT table may be divided into several sub-tables, for example one sub-table by IP services broadcaster. The receiver is then in charge to rebuild a complete table when storing into the non-volatile memory.

The block schematic of the FIG. 2 illustrates a processing unit (STB) comprising a first receiver module (R1) configured for the reception of services from the DVB stream and a second receiver module (R2) configured for the reception of services from the IP stream. The unit (STB) further comprises switching means (SW) for activating the reception of the IP services with the second receiver module (R2) when the reception of the DVB services with the first module (R1) becomes bad or no more possible. The processing and displaying means (P/A) connected to the processing unit (STB) allow presenting to the user the information on the DVB and/or IP services on a television set or any other visualization screen.

The NIT, SDT or BAT table received by the first receiver module, i.e. via the network of the type DVB, contains the information on the services broadcasted by the IP network. This table is completed by the managing center, according to the above described method, with the IP addresses accompanying the services descriptors and accessorily the references of the IP broadcasters.

In case of a bad reception by the first receiver module of a service from the DVB network, the processing unit activates, either automatically or manually by the user according to the displayed information, the reception by the second receiver module, i.e. via the IP network, in order to receive one or several services equivalent to the defective one.

The invention claimed is:

1. A method for transmitting services information in a broadcasting network by at least one managing center towards a plurality of processing units connected to a first network of DVB type and to a second network of IP type, both networks broadcasting digital data streams including content data of services and additional information data on said services structured in tables adapted to the transmission protocol specific to each type of network, the method comprises the steps of:
   exploring the first and second network and extracting services information from the streams broadcasted by the first network and the second network,
   inserting services information extracted from the streams of the second network into an information table transmitted by the first network, said information table being situated at the highest level in the hierarchy of the services information tables of the first network, said services information including at least one descriptor comprising an identifier of a service broadcasted by the second network and an IP address corresponding to said service, obtaining a modified information table,
   transmitting the modified information table in the streams broadcasted by the first network towards the processing units, said modified information table contributing to reduce the analysis and processing tasks executed by the processing units during determination of the service of the second network corresponding to a currently received service of the first network.

2. The method according to claim 1, wherein the modified information table includes the network information table NIT defined according to the standards ETSI EN 300 468.

3. The method according to claim 1, wherein the modified information table includes the bouquet association table BAT or of the services description table SDT defined according to the standards ETSI EN 300 468.

4. The method according to claim 1 wherein the information table is modified by further adding a reference of the broadcaster of the IP services.

5. The method according to claim 1 wherein the modified information table is transmitted divided into several sub-tables each attributed to a broadcaster of IP services.

6. The method according to claim 1 wherein the information table is modified by adding the services information extracted from the second network, the services information being extracted from a Service Discovery & Selection (SD&S) structure transmitted by the second network.

7. The method according to claim 1 wherein the services information concerning the IP network are introduced into the information table from files or from databases.

8. A processing unit of digital data services streams, the processing unit comprising:
   a first receiver module configured to receive digital data streams from a first network of the type DVB and a second receiver module configured to receive digital data streams from a second network of the type IP, the first and second receiver modules being linked to a device for processing and displaying of broadcasted services information data;
   a switching device configured to activate the reception of digital data of a service equivalent to the service currently received with the second receiver module when the receiving conditions by the first receiver module are degraded, and
   the processing unit being configured to determine the equivalent service from a services information table stored in a non-volatile memory, situated at the highest level in the hierarchy of the services information tables, said services information table containing descriptors comprising identifiers of services of the DVB type and IP addresses corresponding to said services of the DVB type.

9. The processing unit according to claim 8, wherein the equivalent service is determined by the network information table NIT defined according to the standards ETSI EN 300 468.

10. The processing unit according to claim 8, wherein the equivalent service is determined by the bouquet association table BAT or by the services description table SDT defined according to the standards ETSI EN 300 468.

11. The processing unit according to claim 8, wherein the second receiver module is configured to activate automatically the reception of the digital data when the receiving conditions by the first receiver module are degraded.

12. The processing unit according to claim 8, wherein the second receiver module is configured to activate manually the reception of the digital data when the receiving conditions by the first receiver module are degraded.

* * * * *